US012160736B2

(12) United States Patent
Takeuchi

(10) Patent No.: US 12,160,736 B2
(45) Date of Patent: *Dec. 3, 2024

(54) COMMUNICATION DEVICE AND NON-TRANSITORY COMPUTER-READABLE RECORDING MEDIUM STORING COMPUTER-READABLE INSTRUCTIONS FOR COMMUNICATION DEVICE

(71) Applicant: Brother Kogyo Kabushiki Kaisha, Nagoya (JP)

(72) Inventor: Shun Takeuchi, Kiyosu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,938

(22) Filed: Aug. 21, 2023

(65) Prior Publication Data

US 2023/0397003 A1 Dec. 7, 2023

Related U.S. Application Data

(63) Continuation of application No. 17/564,577, filed on Dec. 29, 2021, now Pat. No. 11,785,457, which is a
(Continued)

(30) Foreign Application Priority Data

Oct. 24, 2018 (JP) .................. 2018-200036

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0428* (2013.01); *H04L 63/08* (2013.01); *H04W 12/03* (2021.01); *H04W 12/08* (2013.01)

(58) Field of Classification Search
CPC ..... H04W 12/06; H04W 12/08; H04W 63/08; H04L 63/0428; H04L 63/08
See application file for complete search history.

(56) References Cited

U.S. PATENT DOCUMENTS 9,426,733 B2 8/2016 Hamachi
2010/0082978 A1* 4/2010 Suzuki .................. H04L 63/083
713/168
(Continued)

FOREIGN PATENT DOCUMENTS

JP 2011-066561 A 3/2011
JP 2012-199906 A 10/2012
(Continued)

OTHER PUBLICATIONS

Wi-Fi Alliance, "Device Provisioning Protocol Specification", Version 1.0, pp. 1-124, Apr. 2018.
Aug. 9, 2022—(JP) Notice of Reasons for Refusal—App 2018-200036.

*Primary Examiner* — Chau Le
(74) *Attorney, Agent, or Firm* — Banner & Witcoff, Ltd.

(57) ABSTRACT

A communication device may obtain second security information in a case where a first instruction for establishing a second wireless connection with a second parent station is accepted under a state where a first wireless connection with a first parent station is established, and determine whether a second security level indicated by the second security information is lower than a first security level indicated by first security information in a memory. The communication device may execute at least one process of a notification process or an acceptance process in a case where it is determined that the second security level is lower than the first security level and establish the second wireless connection with the second parent station without executing the
(Continued)

at least one process in a case where it is determined that the second security level is not lower than the first security level.

15 Claims, 10 Drawing Sheets

Related U.S. Application Data continuation of application No. 16/575,988, filed on Sep. 19, 2019, now Pat. No. 11,218,874.

(51) Int. Cl.
*H04W 12/03* (2021.01)
*H04W 12/08* (2021.01)

(56) References Cited

U.S. PATENT DOCUMENTS

| | | | |
|---|---|---|---|
| 2012/0233338 A1* | 9/2012 | Hamachi | H04W 12/08 |
| | | | 709/227 |
| 2014/0307874 A1 | 10/2014 | Adachi et al. | |
| 2016/0007200 A1* | 1/2016 | Shibata | H04L 63/205 |
| | | | 713/168 |
| 2017/0180342 A1* | 6/2017 | Hamachi | H04W 76/11 |
| 2024/0048976 A1* | 2/2024 | Miyake | H04W 12/037 |

FOREIGN PATENT DOCUMENTS

| | | |
|---|---|---|
| JP | 2016-019085 A | 2/2016 |
| JP | 2017-112552 | 6/2017 |
| JP | 2018-042280 A | 3/2018 |
| WO | 2018075135 A1 | 4/2018 |

* cited by examiner

COMMUNICATION DEVICE AND NON-TRANSITORY COMPUTER-READABLE RECORDING MEDIUM STORING COMPUTER-READABLE INSTRUCTIONS FOR COMMUNICATION DEVICE

CROSS-REFERENCE TO RELATED APPLICATION

This application is a continuation of U.S. patent application Ser. No. 17/564,577 filed Dec. 29, 2021 which is a continuation of U.S. patent application Ser. No. 16/575,988 filed Sep. 19, 2019, issued as U.S. Pat. No. 11,218,874 on Jan. 4, 2022, which claims priority to Japanese Patent Application No. 2018-200036, filed on Oct. 24, 2018, the entire contents of which are hereby incorporated by reference into the present application.

TECHNICAL FIELD

The present disclosure discloses a technique related to a communication device capable of establishing a wireless connection with a parent station.

BACKGROUND ART

A technique is known for using a management device to change an access point to which a station is connected from a first access point to a second access point having higher security than the first access point. The management device obtains, from the first access point, a first communication parameter for connecting to the first access point, and sends the first communication parameter to the second access point. When the second access point receives the first communication parameter from the management device, the second access point changes a security scheme (that is, a combination of authentication scheme and encryption scheme) of the first communication parameter to a scheme with high security, and creates a second communication parameter. Further, the management device receives authentication information from the station, and sends the authentication information to the second access point. Thereby, the second access point uses the authentication information to send the second communication parameter including the scheme with high security to the station and establishes a connection with the station.

SUMMARY

In a situation where the station changes the access point to which it is connected, it is not preferable that the station is connected to an access point having lower security than the first access point.

The disclosure herein discloses a technique which is capable of suppressing establishment of a second wireless connection between a communication device and a second parent station in a state where a first wireless connection is established between the communication device and a first parent station, where the second wireless connection has a security level lower than a first security level related to the first wireless connection.

A communication device disclosed herein may comprise a processor; and a memory storing first security information indicating a first security level related to a first wireless connection with a first parent station, the memory further storing computer-readable instructions therein, the computer-readable instructions, when executed by the processor, causing the communication device to: in a case where a first instruction for establishing a second wireless connection with a second parent station different from the first parent station is accepted under a state where the first wireless connection is established, obtain second security information indicating a second security level related to the second wireless connection; in a case where the second security information is obtained under a state where the first security information is stored in the memory, determine whether the second security level indicated by the second security information is lower than the first security level indicated by the first security information in the memory; in a case where it is determined that the second security level is lower than the first security level, execute at least one process of a notification process or an acceptance process, the notification process being for notifying that the second security level is lower than the first security level, the acceptance process being for accepting an input of authentication information for establishing the second wireless connection with the second parent station; and in a case where it is determined that the second security level is not lower than the first security level, establish the second wireless connection with the second parent station without executing the at least one process.

Further, another communication device disclosed herein may comprise a processor; and a memory storing first security information indicating a first security level related to a first wireless connection with a first parent station, the memory further storing computer-readable instructions therein, the computer-readable instructions, when executed by the processor, causing the communication device to: in a case where a first instruction for establishing a second wireless connection with a second parent station different from the first parent station is accepted under a state where the first wireless connection is established, obtain second security information indicating a second security level related to the second wireless connection; in a case where the second security information is obtained under a state where the first security information is stored in the memory, determine whether the second security level indicated by the second security information is lower than the first security level indicated by the first security information in the memory; and in a case where it is determined that the second security level is not lower than the first security level, establish the second wireless connection with the second parent station, wherein in a case where it is determined that the second security level is lower than the first security level, the second wireless connection is not established.

Computer programs for implementing the above communication devices and computer-readable media storing the computer programs are also novel and useful. Further, methods implemented by the above communication devices are also novel and useful. Further, a communication system comprising at least one of the above communication device or another device (e.g., a first parent station, a second parent station) is also novel and useful.

BRIEF DESCRIPTION OF THE DRAWINGS

EMBODIMENTS (Configuration of Communication System 2; FIG. 1)

As shown in FIG. 1, a communication system 2 comprises a plurality of APs (abbreviation of Access Points) 6, 7, a printer 10, and a terminal 100. A wireless connection according to a Wi-Fi scheme (hereinbelow termed simply as "Wi-Fi connection") is established between the printer 10 and the AP 6. In this embodiment, a situation is assumed in which a user uses the terminal 100 to establish a Wi-Fi connection between the printer 10 and the AP 7, instead of between the printer 10 and the AP 6.

(Configuration of Printer 10)

Figure 1:
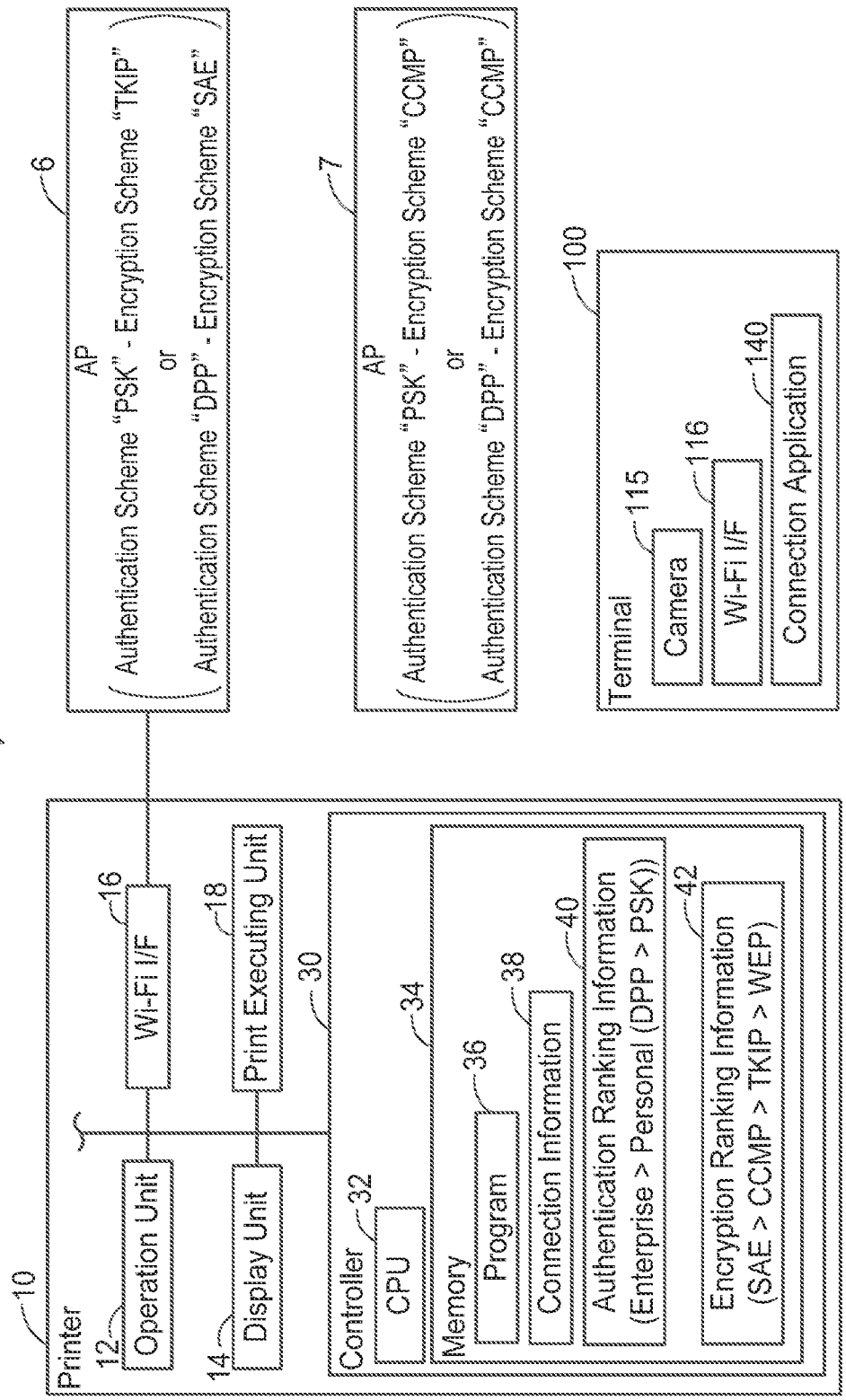
FIG. 1 shows a configuration of a communication system.

The printer 10 is a peripheral device (e.g., a peripheral device of the terminal 100, etc.) capable of executing a print function. The printer 10 comprises an operation unit 12, a display unit 14, a Wi-Fi interface 16, a print executing unit 18, and a controller 30. Hereinbelow, interface will be termed simply as "I/F". The units 12 to 30 are connected to a bus line (reference number omitted).

The operation unit 12 comprises a plurality of keys. The user can input various instructions to the printer 10 by operating the operation unit 12. The display unit 14 is a display for displaying various types of information. The print executing unit 18 comprises a printing mechanism of an ink jet scheme, laser scheme, etc.

The Wi-Fi I/F 16 is a wireless interface configured to execute Wi-Fi communication according to the Wi-Fi scheme. The Wi-Fi scheme is a wireless communication scheme for executing wireless communication according to, for example, 802.11 standard of IEEE (abbreviation of The Institute of Electrical and Electronics Engineers, Inc.) and standards complying thereto (such as 802.11a, 11b, 11g, 11n, 11ac, etc.). The Wi-Fi I/F 16 especially supports Device Provisioning Protocol (DPP) scheme that has been established by the Wi-Fi Alliance. The DPP scheme is described in the standard "Device Provisioning Protocol Specification Version 1.0" created by the Wi-Fi Alliance, and is a wireless communication scheme for easily establishing a Wi-Fi connection between a pair of devices (such as the printer 10 and the AP 7) by using the terminal 100.

The controller 30 comprises a CPU 32 and a memory 34. The CPU 32 executes various processes in accordance with a program 36 stored in the memory 34. The memory 34 is constituted of a volatile memory, a non-volatile memory, and the like. The memory 34 further stores connection information 38, authentication ranking information 40, and encryption ranking information 42. The connection information 38 includes information (that is, an SSID (abbreviation of Service Set Identifier), a password, etc.) for establishing a Wi-Fi connection with a connection target (that is, the AP 6) which the printer 10 is currently establishing the Wi-Fi connection with. In particular, the connection information 38 includes an authentication scheme and an encryption scheme used by the AP 6.

The authentication ranking information 40 indicates a ranking of a plurality of authentication schemes corresponding to security levels related to Wi-Fi connections established between the printer 10 and APs. The authentication schemes are classified into enterprise-type authentication scheme and personal-type authentication scheme. The enterprise-type authentication scheme includes, for example, LEAP (abbreviation of Lightweight Extensible Authentication Protocol), EAP-FAST (abbreviation of Extensible Authentication Protocol-Flexible Authentication via Secured Tunnel), and the like. The personal-type authentication scheme includes, for example, PSK (abbreviation of Pre-shared Key), DPP, and the like. In the authentication ranking information 40, the enterprise-type authentication schemes are ranked higher than the personal-type authentication schemes. Further, in the authentication ranking information 40, DPP is ranked higher than PSK among the personal-type authentication schemes. The authentication ranking information 40 may be stored in advance in the printer 10 by a vendor of the printer 10 prior to shipping of the printer 10, or may be stored in the printer 10 by the user after shipping of the printer 10. The ranking of the authentication schemes in the authentication ranking information 40 is not limited to the aforementioned ranking, and another ranking may be set.

The encryption ranking information 42 indicates a ranking of a plurality of encryption schemes corresponding to security levels. The encryption schemes include, for example, SAE (abbreviation of Simultaneous Authentication of Equals), CCMP (abbreviation of Counter mode CBC MAC Protocol), TKIP (abbreviation of Temporal Key Integrity Protocol), WEP (abbreviation of Wired Equivalent Privacy), and the like. In the encryption ranking information 42, SAE, CCMP, TKIP and WEP are ranked from highest to lowest in this order. The encryption ranking information 42 may be stored in advance in the printer 10 by the vendor of the printer 10 prior to shipping of the printer 10, or may be stored in the printer 10 by the user after shipping of the printer 10. Further, the ranking of the encryption schemes in the encryption ranking information 42 is not limited to the aforementioned ranking, and another ranking may be set.

(Configuration of Terminal 100)

The terminal 100 is a portable terminal device such as a cellphone (e.g., a smartphone), a PDA, a tablet PC, or the like. In a variant, the terminal 100 may be a desktop PC, a laptop PC or the like. The terminal 100 comprises a camera 115 and a Wi-Fi I/F 116. The camera 115 is a device configured to capture images of an object and, in this embodiment, is especially used to capture a QR code for the AP 7 and the printer 10. The Wi-Fi I/F 116 is similar to the Wi-Fi I/F 16 of the printer 10. That is, the terminal 100 supports the DPP scheme. Further, the terminal 100 stores a connection application (hereinbelow termed simply as "app") 140 for establishing a Wi-Fi connection between a pair of devices according to the DPP scheme. The app 140 is installed on the terminal 100 from, for example, a server on the Internet provided by the vendor of the printer 10.

(Configurations of APs 6, 7)

The APs 6, 7 are each a known AP called a wireless AP, a wireless LAN router, and the like. The APs 6, 7 also support the DPP scheme. The AP 6 stores a combination of the authentication scheme "PSK" and the encryption scheme "TKIP", or a combination of the authentication scheme "DPP" and the encryption scheme "SAE" as the combination of authentication scheme and encryption scheme supported by the AP 6. The AP 7 stores a combination of the authentication scheme "PSK" and the encryption scheme "CCMP", or a combination of the authentication scheme "DPP" and the encryption scheme "CCMP" as the combination of authentication scheme and encryption scheme supported by the AP 7.

As above, the APs 6, 7 support different combinations of authentication schemes and encryption schemes. For this reason, there is a possibility that between the printer 10 and the AP 7, a Wi-Fi connection that has a security level lower than the security level of the Wi-Fi connection between the printer 10 and the AP 6 may be established. This embodiment suppresses a Wi-Fi connection having a security level lower than the security level of the Wi-Fi connection with the AP 6 from being established between the printer 10 and the AP 7.

Figure 2:
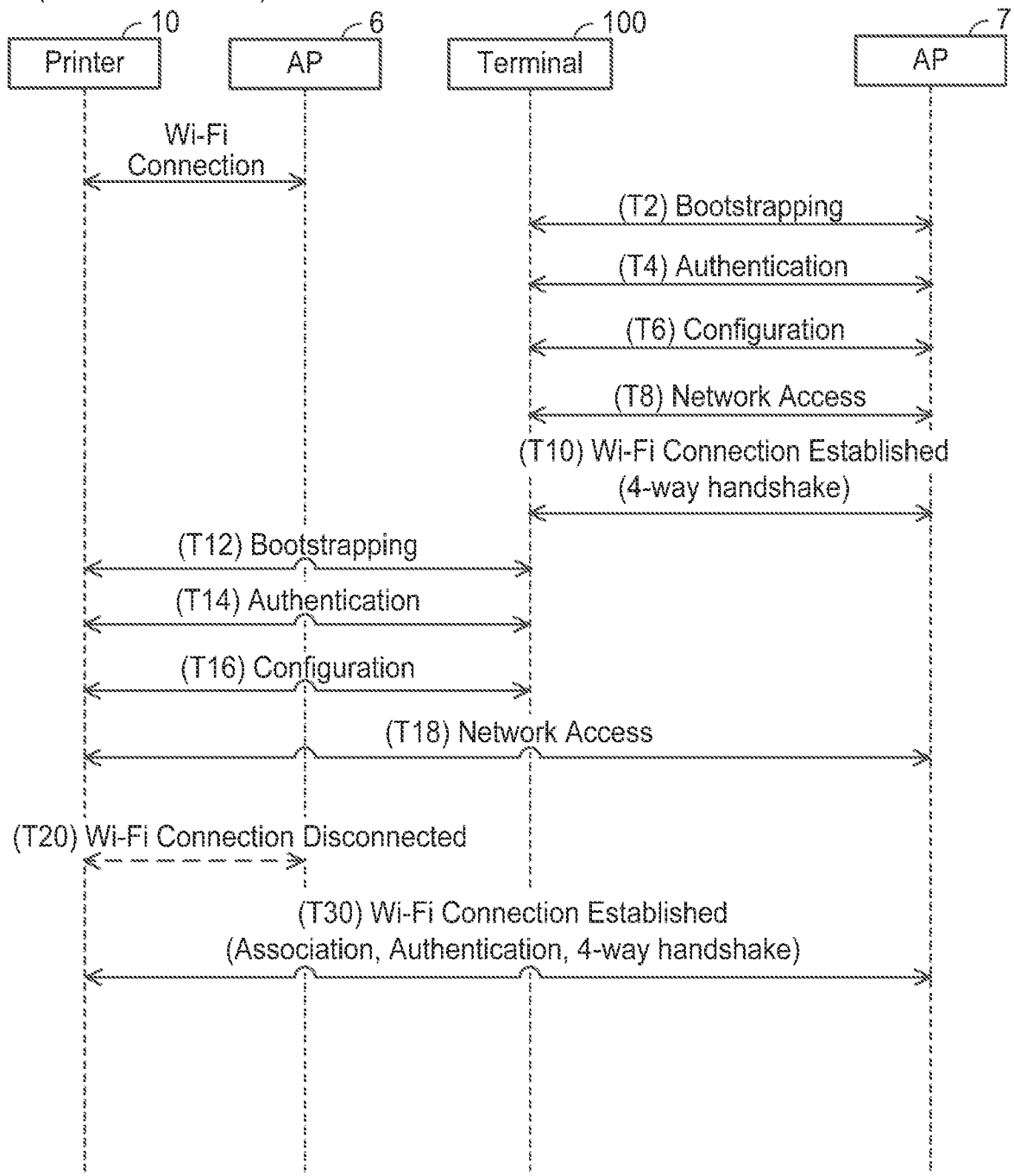
FIG. 2 shows an explanatory diagram for explaining an outline of a first embodiment.

Outline of Present Embodiment; FIG. 2

Next, an outline of the present embodiment will be described with reference to FIG. 2.

In the present embodiment, in a situation where the Wi-Fi connection is established between the printer 10 and the AP 6, the devices 7, 10 and 100 execute communication according to the DPP scheme to establish a Wi-Fi connection between the printer 10 and the AP 7 instead of between the printer 10 and the AP 6.

Hereinbelow, for easier understanding, operations executed by the CPUs of the respective devices (e.g., the CPU 32, etc.) will be described with the devices (e.g., the printer 10) as the subject of operation, not with the CPUs as the subject of operation.

In T2, the terminal 100 executes Bootstrapping (hereinbelow termed simply as "BS") according to the DPP scheme with the AP 7. This BS is a process of providing information that is to be used in Authentication (hereinbelow termed simply as "Auth") of T4 (to be described later) from the AP 7 to the terminal 100 in response to a QR code adhered to the AP 7 being captured by the terminal 100.

In T4, the terminal 100 executes Auth according to the DPP scheme with the AP 7 by using the information obtained in the BS of T2. This Auth is a process for the terminal 100 and the AP 7 to authenticate their communication counterparts.

In T6, the terminal 100 executes Configuration (hereinbelow termed simply as "Config") according to the DPP scheme with the AP 7. This Config is a process of sending information for establishing a Wi-Fi connection between the printer 10 and the AP 7 to the AP 7. Specifically, in the Config, the terminal 100 creates a Configuration Object (hereinbelow, Configuration Object is simply be termed "CO") for AP for establishing a Wi-Fi connection between the printer 10 and the AP 7, and sends the CO for AP to the AP 7. As a result, the CO for AP is stored in the AP 7.

In T8, the terminal 100 executes Network Access (hereinbelow simply termed "NA") according to the DPP scheme with the AP 7. In this NA, the terminal 100 creates a CO for terminal and stores the CO for terminal in a memory (not shown) of the terminal 100. Then, the terminal 100 and the AP 7 share a connection key for establishing a Wi-Fi connection between the terminal 100 and the AP 7 by using the CO for terminal and the CO for AP.

In T10, the terminal 100 and the AP 7 execute 4 way-handshake communication. During at least a part of the 4 way-handshake communication, the terminal 100 and the AP 7 communicate encrypted information that is encrypted by the connection key shared in the NA of T8. Then, in a case where decryption of the encrypted information succeeds, a normal Wi-Fi connection is established between the terminal 100 and the AP 7. Thereby, the terminal 100 participates as a child station in a wireless network formed by the AP 7. In this case, the terminal 100 stores the authentication scheme "DPP" and the encryption scheme "CCMP" used by the AP 7.

Next, the terminal 100 executes BS according to the DPP scheme with the printer 10 in T12. This BS is a process of providing information that is to be used in Auth of T14 (to be described later) from the printer 10 to the terminal 100 in response to a QR code displayed in the printer 10 being captured by the terminal 100.

In T14, the terminal 100 executes Auth according to the DPP scheme with the printer 10 by using the information obtained in the BS of T12. This Auth is a process for the terminal 100 and the printer 10 to authenticate their communication counterparts.

In T16, the terminal 100 executes Config according to the DPP scheme with the printer 10. This Config is a process of sending information for establishing a Wi-Fi connection between the printer 10 and the AP 7 to the printer 10. In this Config, the terminal 100 creates a CO for printer for establishing a Wi-Fi connection between the printer 10 and the AP 7, and sends the CO for printer to the printer 10. As a result, the CO for printer is stored in the printer 10.

In T18, the printer 10 and the AP 7 execute NA according to the DPP scheme by using the stored CO for AP and CO for printer. By using the CO for printer and the CO for AP, the printer 10 and the AP 7 share a connection key for establishing a Wi-Fi connection between the printer 10 and the AP 7.

The printer 10 disconnects the Wi-Fi connection with the AP 6 in T20. Specifically, the printer 10 sends, to the AP 6, a disconnection request that requests disconnection of the Wi-Fi connection, and disconnects the Wi-Fi connection with the AP 6.

In T30, the printer 10 executes various communications (Association, Authentication, 4-way handshake) with the AP 7. During at least a part of the 4 way-handshake communication, the printer 10 and the AP 7 communicate encrypted information that is encrypted by the connection key shared in the NA of T18. Then, in a case where decryption of the encrypted information succeeds, a Wi-Fi connection is established between the printer 10 and the AP 7. Thereby, the printer 10 can participate as a child station in the wireless network formed by the AP 7, as a result of which the printer 10 can execute communication, via the AP 7, with another device (e.g., the terminal 100) participating in this wireless network.

In the DPP scheme, in order to establish the Wi-Fi connection between the printer 10 and the AP 7, the user does not need to input information of the wireless network in which the AP 7 operates as a parent station (such as an SSID and a password) to the printer 10. As such, the user can easily establish the Wi-Fi connection between the printer 10 and the AP 7.

(Description of Processes; FIG. 3 to FIG. 7)

Next, details of the processes executed in T12 to T30 of FIG. 2 will be described with reference to FIG. 3 to FIG. 7. Since the processes of T2 to T8 are the same as the processes of T12 to T18 except that the AP 7 is used instead of the printer 10, a detailed description thereof is omitted.

Figure 3:
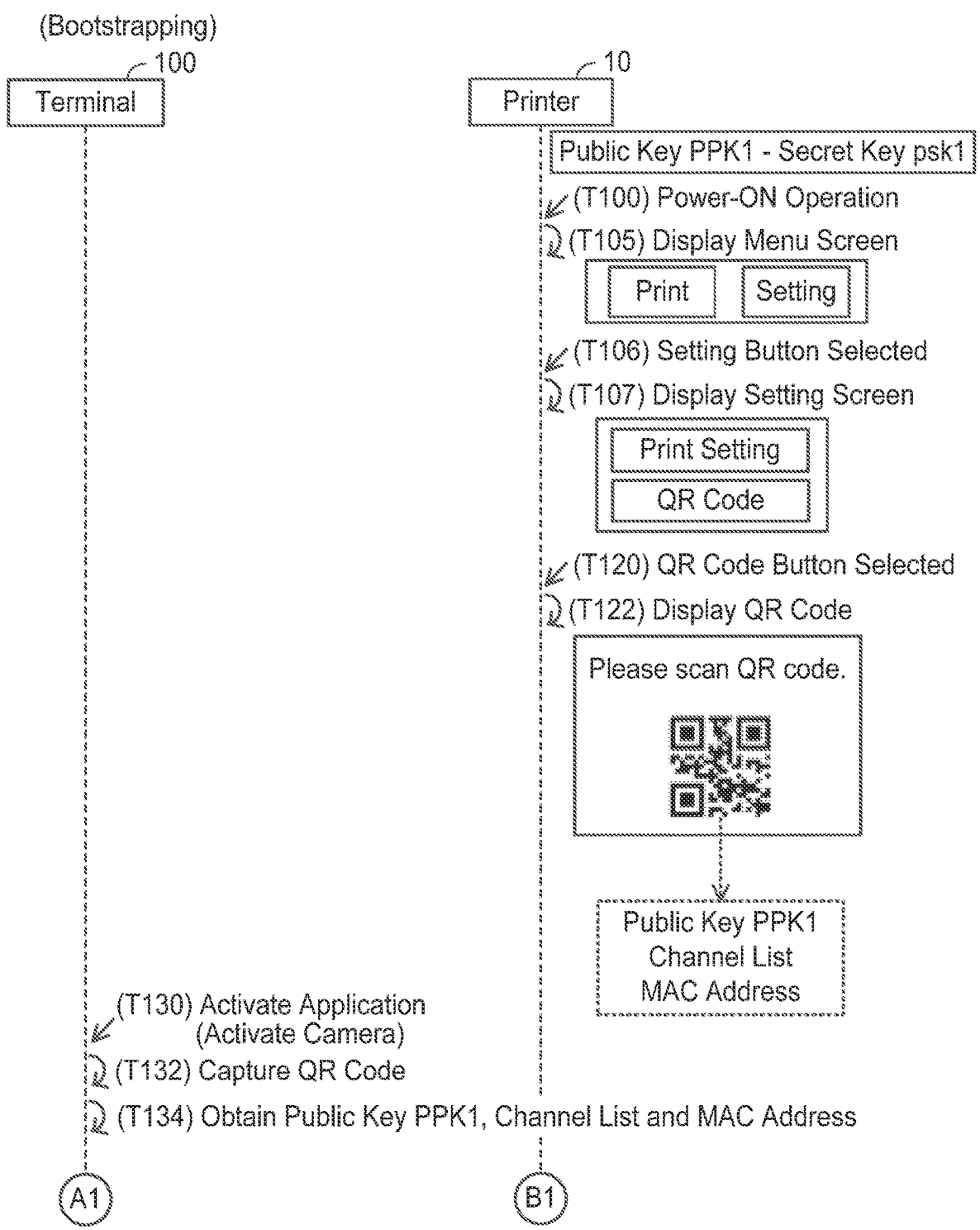
FIG. 3 shows a sequence diagram of a process of Bootstrapping.

(Bootstrapping (BS); FIG. 3)

Firstly, a process of the BS in T12 of FIG. 2 will be described with reference to FIG. 3. In an initial state of FIG.

3, the memory 34 of the printer 10 stores in advance a public key PPK1 and a secret key psk1 of the printer 10.

In response to accepting a power-ON operation by the user in T100, the printer 10 causes the display unit 14 to display a menu screen in T105. The menu screen includes a print button for causing the printer 10 to execute print and a setting button for designating various settings (such as print setting) of the printer 10.

In response to the setting button in the menu screen being selected by the user in T106, the printer 10 causes the display unit 14 to display a setting screen in T107. The setting screen includes a print setting button for changing print settings of the printer 10 and a QR code button for causing the printer 10 to display its QR code.

In response to the QR code button in the setting screen being selected by the user in T120, the printer 10 causes the display unit 14 to display the QR code in T122. This QR code is a code image obtained by coding the public key PPK1 stored in advance in the memory 34, a channel list stored in advance in the memory 34, and a MAC address of the printer 10. The channel list is a list of values of a plurality of communication channels to be used in the Auth (see T14 of FIG. 2). This QR code may be created by the printer 10 when the process of T122 is executed, or may be stored in advance in the memory 34 at shipping of the printer 10.

The terminal 100 activates the app 140 in T130 in response to accepting an activation operation for the app 140 by the user, and further activates the camera 115. Following processes to be executed by the terminal 100 are realized by the app 140. Next, in T132, the terminal 100 captures the QR code displayed on the printer 10 (see T122) by using the camera 115. Further, in T134, the terminal 100 decodes the captured QR code and obtains the public key PPK1, the channel list, and the MAC address. When the process of T134 is completed, the process of the BS is terminated.

Figure 4:
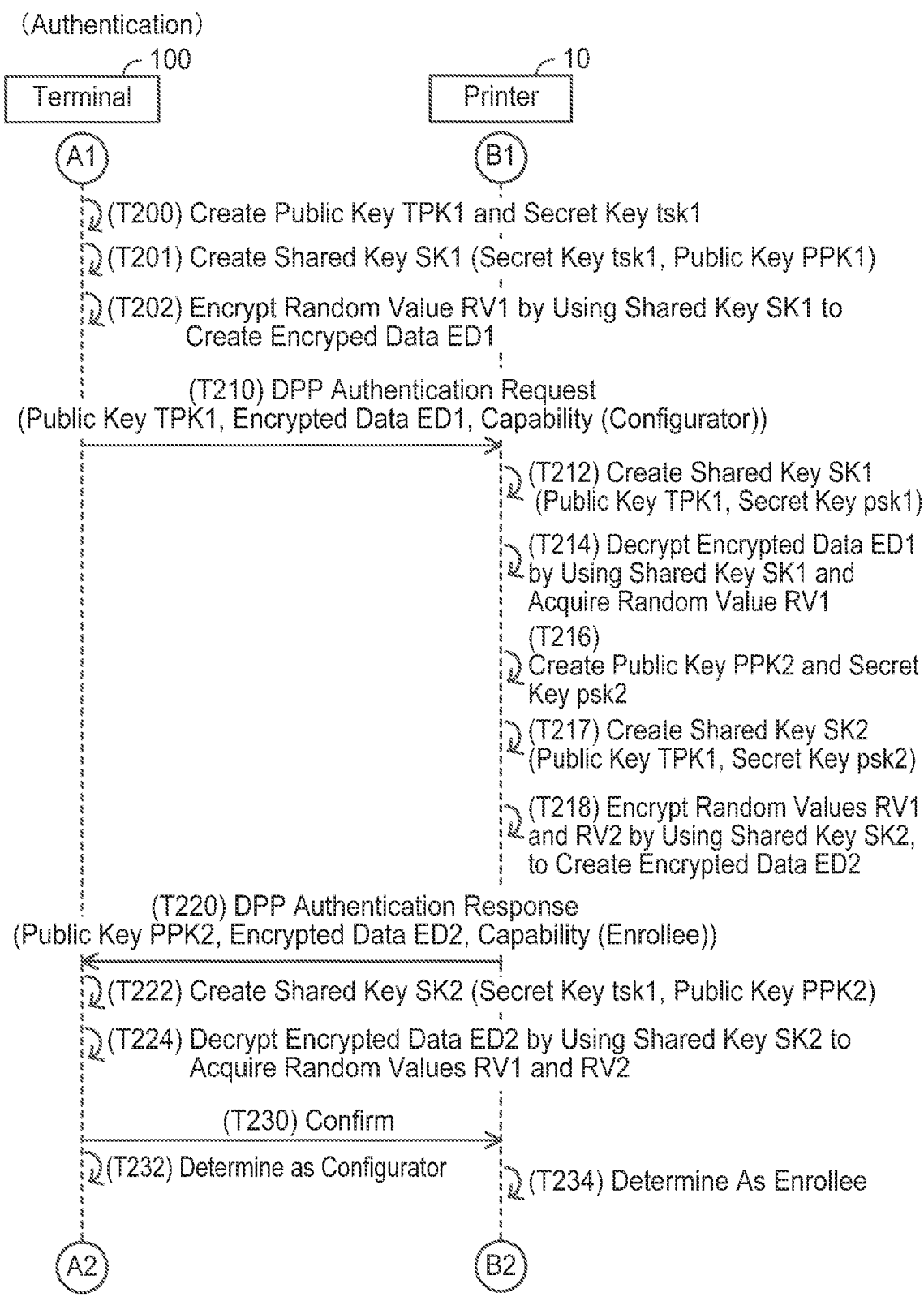
FIG. 4 shows a sequence diagram of a process of Authentication.

(Authentication (Auth); FIG. 4)

Next, the process of the Auth in T14 of FIG. 2 will be described with reference to FIG. 4. The terminal 100 creates a public key TPK1 and a secret key tsk1 of the terminal 100 in T200. Next, in T201, the terminal 100 creates a shared key SK1 according to ECDH (abbreviation of Elliptic curve Diffie-Hellman key exchange) by using the created secret key tsk1 and the public key PPK1 of the printer 10 obtained in T134 of FIG. 3. Then, in T202, the terminal 100 creates encrypted data ED1 by using the created shared key SK1 to encrypt a random value RV1.

In T210, the terminal 100 sends a DPP Authentication Request (hereinbelow termed simply as "AReq") via the Wi-Fi I/F 116 to the printer 10 by setting the MAC address of the printer 10 obtained in T134 of FIG. 3 as its destination. The AReq is a signal for requesting the printer 10 to execute authentication, and includes the public key TPK1 of the terminal 100 generated in T200, the encrypted data ED1 generated in T202 and capability of the terminal 100. Here, the terminal 100 repeats sending the AReq to the printer 10 by sequentially using the plurality of communication channels in the channel list obtained in T134.

The capability is information that is pre-designated in a device supporting the DPP scheme, and includes any one of the following values: a value indicating that this device is capable of operating only as a Configurator according to the DPP scheme, a value indicating that this device is capable of operating only as an Enrollee according to the DPP scheme, and a value indicating that this device is capable of operating as any of the Configurator and the Enrollee. The Configurator refers to a device configured to send a CO used in NA (e.g., T18 of FIG. 2) to an Enrollee in Config (e.g., T16 of FIG. 2). On the other hand, the Enrollee refers to a device that receives the CO used in the NA from the Configurator in the Config. As above, in this embodiment, the terminal 100 creates the CO for AP and the CO for printer, and sends them respectively to the AP 7 and the printer 10. As such, the capability of the terminal 100 includes the value indicating that it is capable of operating only as the Configurator.

The printer 10 receives the AReq from the terminal 100 via the Wi-Fi I/F 16 in T210. As above, this AReq is sent with the MAC address of the printer 10 as the destination. As such, the printer 10 can suitably receive this AReq from the terminal 100. Further, when the printer 10 displays the QR code in T122 of FIG. 3, it monitors receipt of the AReq by using one communication channel among the plurality of communication channels in the channel list. As above, the AReq in T210 is sent by sequentially using the plurality of communication channels in the channel list. As such, the printer 10 can suitably receive this AReq from the terminal 100.

Next, the printer 10 executes following processes for authenticating the sender of the AReq (that is, the terminal 100). Specifically, firstly, in T212, the printer 10 creates a shared key SK1 according to the ECDH by using the public key TPK1 of the terminal 100 in the AReq and the secret key psk1 of the printer 10 stored in advance in the memory 34. Here, the shared key SK1 created by the terminal 100 in T201 and the shared key SK1 created by the printer 10 in T212 are identical to each other. Thus, the printer 10 can suitably decrypt in T214 the encrypted data ED1 in the AReq by using the created shared key SK1, as a result of which it can obtain the random value RV1. In a case where the decryption of the encrypted data ED1 succeeds, the printer 10 determines that the sender of the AReq is the device that captured the QR code displayed on the printer 10, that is, determines that the authentication succeeded, and executes subsequent processes from T216. On the other hand, in a case where the decryption of the encrypted data ED1 does not succeed, the printer 10 determines that the sender of the AReq is not the device that captured the QR code displayed on the printer 10, that is, determines that the authentication failed, and does not execute the subsequent processes from T216.

In T216, the printer 10 creates a new public key PPK2 and a new secret key psk2 of the printer 10. In a variant, the public key PPK2 and the secret key psk2 may be stored in advance in the memory 34. Next, in T217, the printer 10 creates a shared key SK2 according to the ECDH by using the public key TPK1 of the terminal 100 in the AReq of T210 and the created secret key psk2 of the printer 10. Then, in T218, the printer 10 creates encrypted data ED2 by using the created shared key SK2 to encrypt the obtained random value RV1 and a new random value RV2.

In T220, the printer 10 sends an DPP Authentication Response (hereinbelow termed simply as "ARes") to the terminal 100 via the Wi-Fi I/F 16. This ARes includes the public key PPK2 of the printer 10 created in T216, the encrypted data ED2 created in T218, and a capability of the printer 10. This capability includes the value indicating that the printer 10 is capable of operating only as the Enrollee.

In response to receiving the ARes from the printer 10 via the Wi-Fi I/F 116 in T220, the terminal 100 executes following processes for authenticating the sender of the ARes (that is, the printer 10). Specifically, in T222, the terminal 100 creates a shared key SK2 according to the ECDH by using the secret key tsk1 of the terminal 100 created in T200 and the public key PPK2 of the printer 10 in the ARes. Here, the shared key SK2 created by the printer 10 in T217 and the shared key SK2 created by the terminal 100 in T222 are identical to each other. Thus, the terminal 100 can suitably decrypt in T224 the encrypted data ED2 in the ARes by using the created shared key SK2, as a result of which it can obtain the random values RV1 and RV2. In a case where the decryption of the encrypted data ED2 succeeds, the terminal 100 determines that the sender of the ARes is the device that displayed the captured QR code, that is, determines that the authentication succeeded, and executes subsequent processes from T230. On the other hand, in a case where the decryption of the encrypted data ED2 does not succeed, the terminal 100 determines that the sender of the ARes is not the device that displayed the captured QR code, that is, determines that the authentication failed, and does not execute the subsequent processes from T230.

In T230, the terminal 100 sends a Confirm to the printer 10 via the Wi-Fi I/F 116. The Confirm includes information indicating that the terminal 100 operates as the Configurator and the printer 10 operates as the Enrollee. As a result, the terminal 100 determines to operate as the Configurator in T232, and the printer 10 determines to operate as the Enrollee in T234. When the process of T234 is completed, the process of FIG. 4 is terminated.

Figure 5:
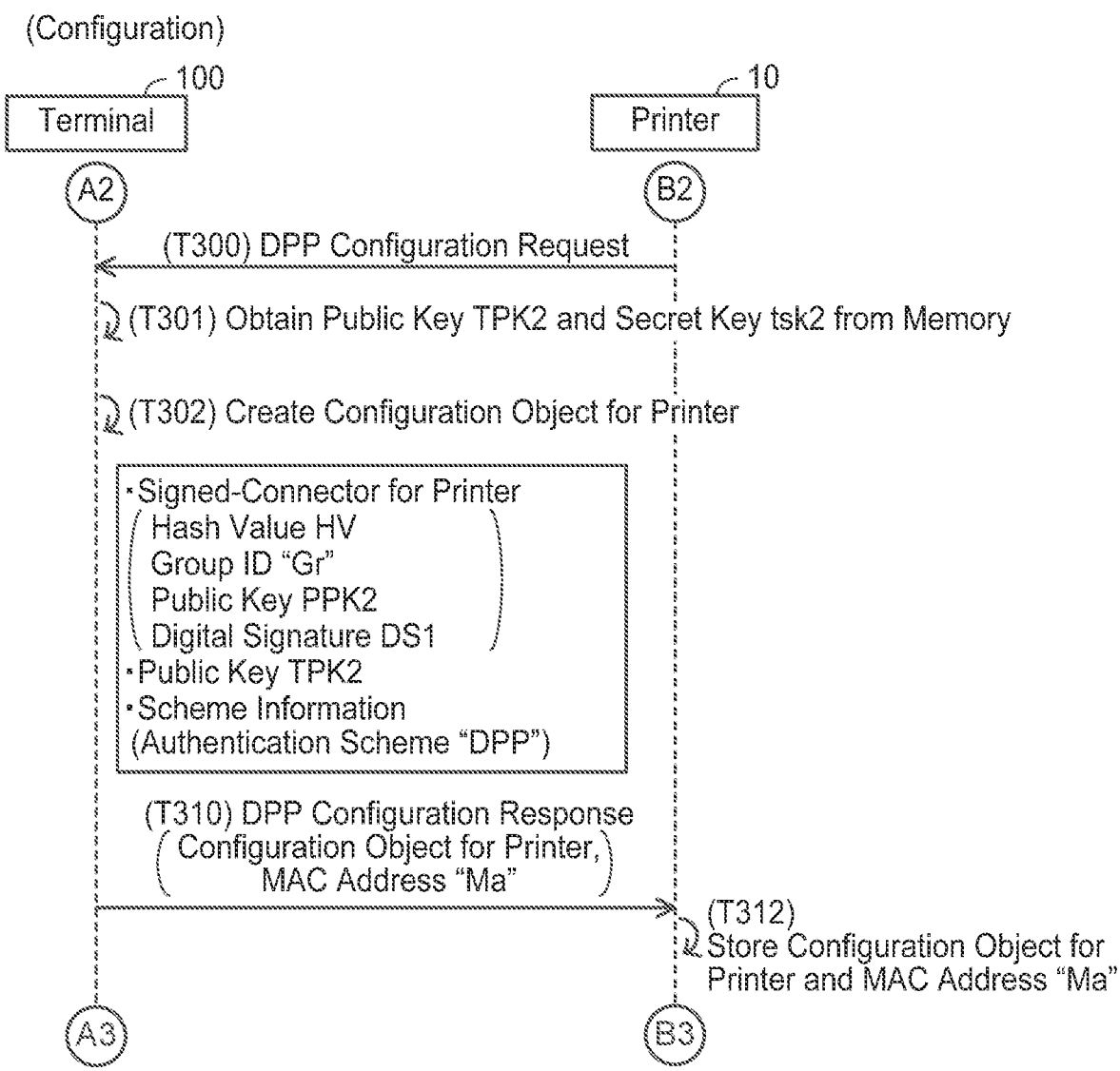
FIG. 5 shows a sequence diagram of a process of Configuration.

(Configuration (Config); FIG. 5)

Next, the process of Config in T16 of FIG. 2 will be described with reference to FIG. 5. In T300, the printer 10 sends a DPP Configuration Request (hereinbelow termed simply as "CReq") to the terminal 100 via the Wi-Fi I/F 16. This CReq is a signal requesting the CO for printer to be sent.

The terminal 100 receives the CReq from the printer 10 in T300 via the Wi-Fi I/F 116. In this case, the terminal 100 obtains a group ID "Gr", a public key TPK2, and a secret key tsk2 from the memory of the terminal 100 in T301. As aforementioned, the terminal 100 have already executed the Config in T6 of FIG. 2 with the AP 7, and at that occasion the terminal 100 created the group ID "Gr", the public key TPK2, and the secret key tsk2 and stored the same in the memory. The group ID "Gr" is information for identifying a wireless network formed by the Wi-Fi connection being established between the printer 10 and the AP 7. In a variant, a character string designated by the user may be used as the group ID. That is, in T301, the terminal 100 obtains the respective information that were stored in T6 of FIG. 2. Next, in T302, the terminal 100 creates the CO for printer (see T16 of FIG. 2). Specifically, the terminal 100 executes following processes.

The terminal 100 creates a hash value HV by hashing the public key TPK2 of the terminal 100. Further, the terminal 100 creates a first value by hashing a combination of the hash value HV, the group ID "Gr", and the public key PPK2 of the printer 10 in the ARes of T220 of FIG. 4. Then, the terminal 100 creates a digital signature DS1 according to ECDSA (abbreviation of Elliptic Curve Digital Signature Algorithm) by using the secret key tsk2 of the terminal 100 to encrypt the created first value. As a result, the terminal 100 can create a Signed-Connector for printer (hereinbelow, Signed-Connector is simply termed "SC") including the hash value HV, the group ID "Gr", the public key PPK2 of the printer 10, and the digital signature DS1. Further, the terminal 100 creates scheme information including the authentication scheme "DPP" of the AP 7 stored in T10 of FIG. 2. Here, in the DPP scheme, the authentication scheme "PSK", the authentication scheme "DPP", the encryption scheme "SAE", and a combination of the authentication scheme "PSK" and the encryption scheme "SAE" are each defined as one value included in scheme information. For this reason, the terminal 100 creates the scheme information that includes the authentication scheme "DPP" of the AP 7 and does not include the encryption scheme "CCMP" of the AP 7. Then, the terminal 100 creates the CO for printer including the SC for printer, the public key TPK2 of the terminal 100, and the scheme information.

In T10 of FIG. 2, the terminal 100 stored a MAC address "Ma" of the AP 7 in response to the establishment of the Wi-Fi connection with the AP 7. In T310, the terminal 100 sends to the printer 10 via the Wi-Fi I/F 116 a DPP Configuration Response (hereinbelow termed simply as "CRes") including the CO for printer created in T302 and the stored MAC address "Ma" of the AP 7.

When the printer 10 receives the CRes from the terminal 100 via the Wi-Fi I/F 16 in T310, the printer 10 obtains the scheme information from the CO for printer in the CRes and determines that the scheme information includes the authentication scheme but it does not include an encryption scheme. In this case, in T312, the printer 10 stores, in the memory 34, the CO for printer and the MAC address "Ma" in the CRes. When the process of T312 is completed, the process of FIG. 5 is terminated.

Figure 6:
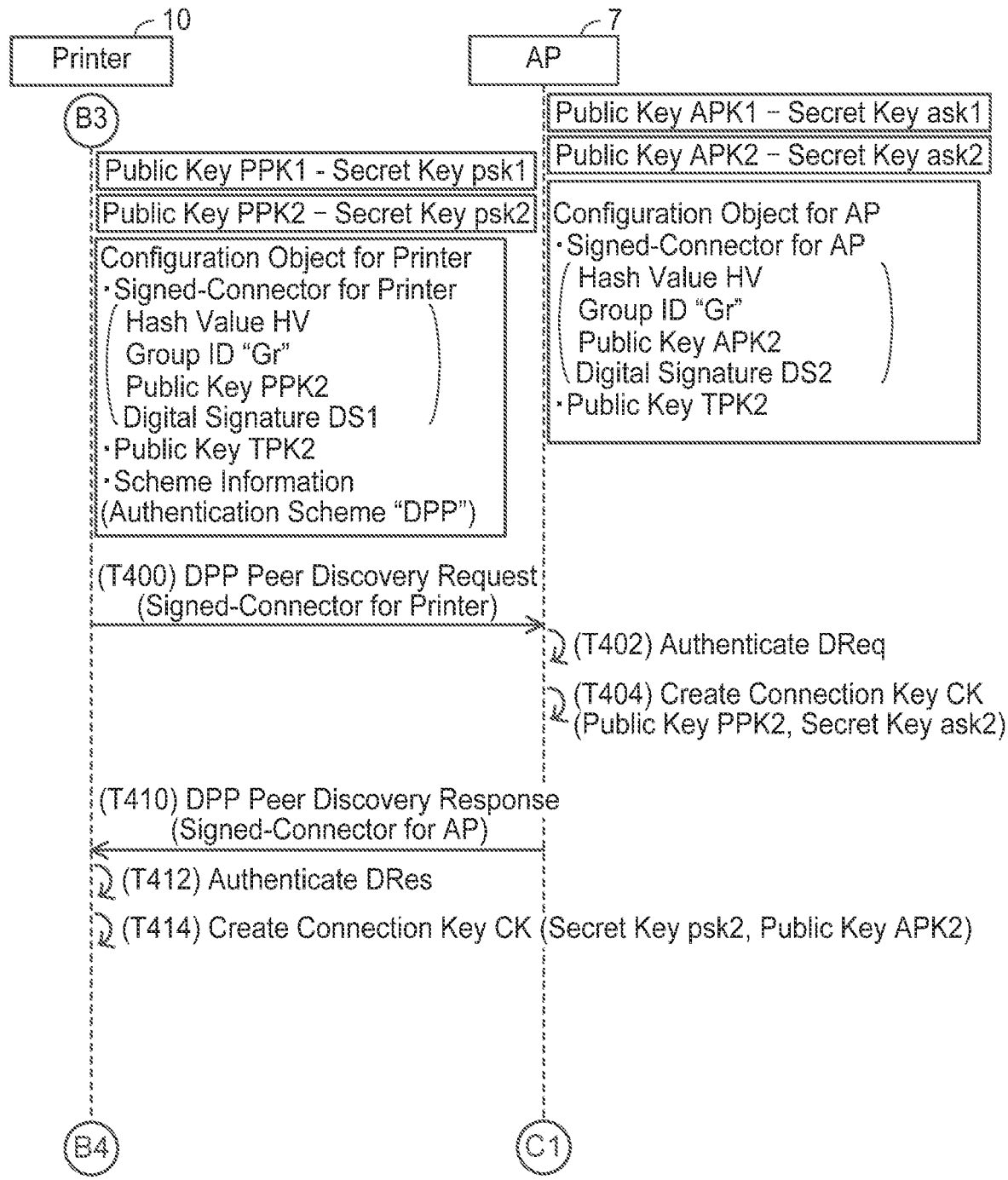
FIG. 6 shows a sequence diagram of a process of Network Access.

(Network Access (NA); FIG. 6)

Next, the process of the NA in T18 of FIG. 2 executed between the printer 10 and the AP 7 will be described with reference to FIG. 6. As aforementioned, the processes of T2 to T6 of FIG. 2 have already been executed between the terminal 100 and the AP 7, similarly to T12 to T16 of FIG. 2. However, the AP 7 does not execute the processes of T105 to T122 of FIG. 3. The AP 7 stores in advance a public key APK1 and a secret key ask1 of the AP 7. Further, the QR code, which is obtained by coding the public key APK1 of the AP 7, a channel list of the AP 7, and the MAC address of the AP 7, is adhered to a housing of the AP 7. Processes similar to the processes from T134 are executed between the terminal 100 and the AP 7 when the terminal 100 captures this QR code. As a result, the AP 7 stores a public key APK2 and a secret key ask2 of the AP 7 (see T216 of FIG. 4), and further stores the CO for AP received from the terminal 100 (see T312 of FIG. 5). The CO for AP includes a SC for AP and a public key TPK2 of the terminal 100. This public key TPK2 is identical to the public key TPK2 included in the CO for printer. Further, the SC for AP includes a hash value HV, a group ID "Gr", the public key APK2 of the AP 7, and a digital signature DS2. This hash value HV and this group ID "Gr" are respectively identical to the hash value HV and the group ID "Gr" included in the CO for printer. The digital signature DS2 is information in which a second value, which is obtained by hashing a combination of the hash value HV, the group ID "Gr", and the public key APK2, is encrypted by the secret key tsk2 of the terminal 100, and is a value different from the digital signature DS1 included in the CO for printer.

In T400, the printer 10 sends a DPP Peer Discovery Request (hereinbelow termed simply as "DReq") including the SC for printer to the AP 7 via the Wi-Fi I/F 16. The DReq is a signal requesting the AP 7 to execute authentication and send the SC for AP.

In response to receiving the DReq from the printer 10 in T400, the AP 7 executes a process for authenticating the sender of the DReq (that is, the printer 10) and the information in the DReq (that is, the hash value HV, the "Gr", and the public key PPK2). Specifically, in T402, the AP 7 firstly executes a first AP determination process that is regarding whether or not the hash value HV and the group ID "Gr" in the received SC for printer are respectively identical to the hash value HV and the group ID "Gr" in the SC for AP included in the stored CO for AP. In the case of FIG. 6, the AP 7 determines "identical" in the first AP determination process, thus it determines that the authentication of the sender of the DReq (that is, the printer 10) succeeds. Here, the fact that the hash value HV in the received SC for printer is identical to the hash value HV in the SC for AP included in the stored CO for AP means that the SC for printer and the SC for AP were created by the same device (that is, the terminal 100). As such, the AP 7 also determines that authentication of the creator of the received SC for printer (that is, the terminal 100) succeeds. Further, the AP 7 decrypts the digital signature DS1 in the received SC for printer by using the public key TPK2 of the terminal 100 included in the stored CO for AP. Since the decryption of the digital signature DS1 succeeds in the case of FIG. 6, the AP 7 executes a second AP determination process that is regarding whether or not a first value obtained by decrypting the digital signature DS1 is identical to a value obtained by hashing the information in the received SC for printer (that is, the hash value HV, the "Gr", and the public key PPK2). In the case of FIG. 6, the AP 7 determines "identical" in the second AP determination process, thus it determines that the authentication of the information in the DReq succeeds, and executes processes from T404. The fact that the AP 7 determines "identical" in the second AP determination process means that the information in the received SC for printer (that is, the hash value HV, the "Gr", and the public key PPK2) has not been tampered by a third party since the CO for printer was stored in the printer 10. On the other hand, in a case where the AP 7 determines "not identical" in the first AP determination process, in a case where the decryption of the digital signature DS1 fails, or in a case where the AP 7 determines "not identical" in the second AP determination process, the AP 7 determines that the authentication fails and does not execute the processes from T404.

Next, in T404, the AP 7 creates a connection key CK (that is, a shared key) by using the obtained public key PPK2 of the printer 10 and the stored secret key ask2 of the AP 7 in accordance with the ECDH.

In T410, the AP 7 sends a DPP Peer Discovery Response (hereinbelow termed simply as "DRes") including the SC for AP to the printer 10.

In response to receiving the DRes from the AP 7 in T410 via the Wi-Fi I/F 16, the printer 10 executes a process for authenticating the sender of the DRes (that is, the AP 7) and the information in the DRes (that is, the hash value HV, the "Gr", and the public key APK2). Specifically, in T412, the printer 10 firstly executes a first PR determination process that is regarding whether or not the hash value HV and the group ID "Gr" in the received SC for AP are respectively identical to the hash value HV and the group ID "Gr" in the SC for printer included in the stored CO for printer. In the case of FIG. 6, the printer 10 determines "identical" in the first PR determination process, thus it determines that the authentication of the sender of the DRes (that is, the AP 7) succeeds. The fact that the hash value HV in the received SC for AP is identical to the hash value HV in the SC for printer included in the stored CO for printer means that the SC for printer and the SC for AP were created by the same device (that is, the terminal 100). As such, the printer 10 also determines that authentication of the creator of the received SC for AP (that is, the terminal 100) succeeds. Further, the printer 10 decrypts the digital signature DS2 in the received SC for AP by using the public key TPK2 of the terminal 100 included in the stored CO for printer. Since the decryption of the digital signature DS2 succeeds in the case of FIG. 6, the printer 10 executes a second PR determination process that is regarding whether or not a second value obtained by decrypting the digital signature DS2 is identical to a value obtained by hashing the information in the received SC for AP (that is, the hash value HV, the "Gr", and the public key APK2). In the case of FIG. 6, the printer 10 determines "identical" in the second PR determination process, thus it determines that the authentication of the information in the DRes succeeds, and executes processes from T414. The fact that the printer 10 determines "identical" in the second PR determination process means that the information in the received SC for AP (that is, the hash value HV, the "Gr", and the public key APK2) has not been tampered by a third party since the CO for AP was stored in the AP 7. On the other hand, in a case where the printer 10 determines "not identical" in the first PR determination process, in a case where the decryption of the digital signature DS2 fails, or in a case where the printer 10 determines "not identical" in the second PR determination process, the printer 10 determines that the authentication fails and does not execute the processes from T414.

In T414, the printer 10 creates a connection key CK by using the stored secret key psk2 of the printer 10 and the public key APK2 of the AP 7 in the received SC for AP in accordance with the ECDH. Here, the connection key CK created by the AP 7 in T404 and the connection key CK created by the printer 10 in T414 are identical to each other. Due to this, the connection key CK for establishing the Wi-Fi connection is shared between the printer 10 and the AP 7. When T414 is completed, the process of FIG. 6 is terminated.

Figure 7:
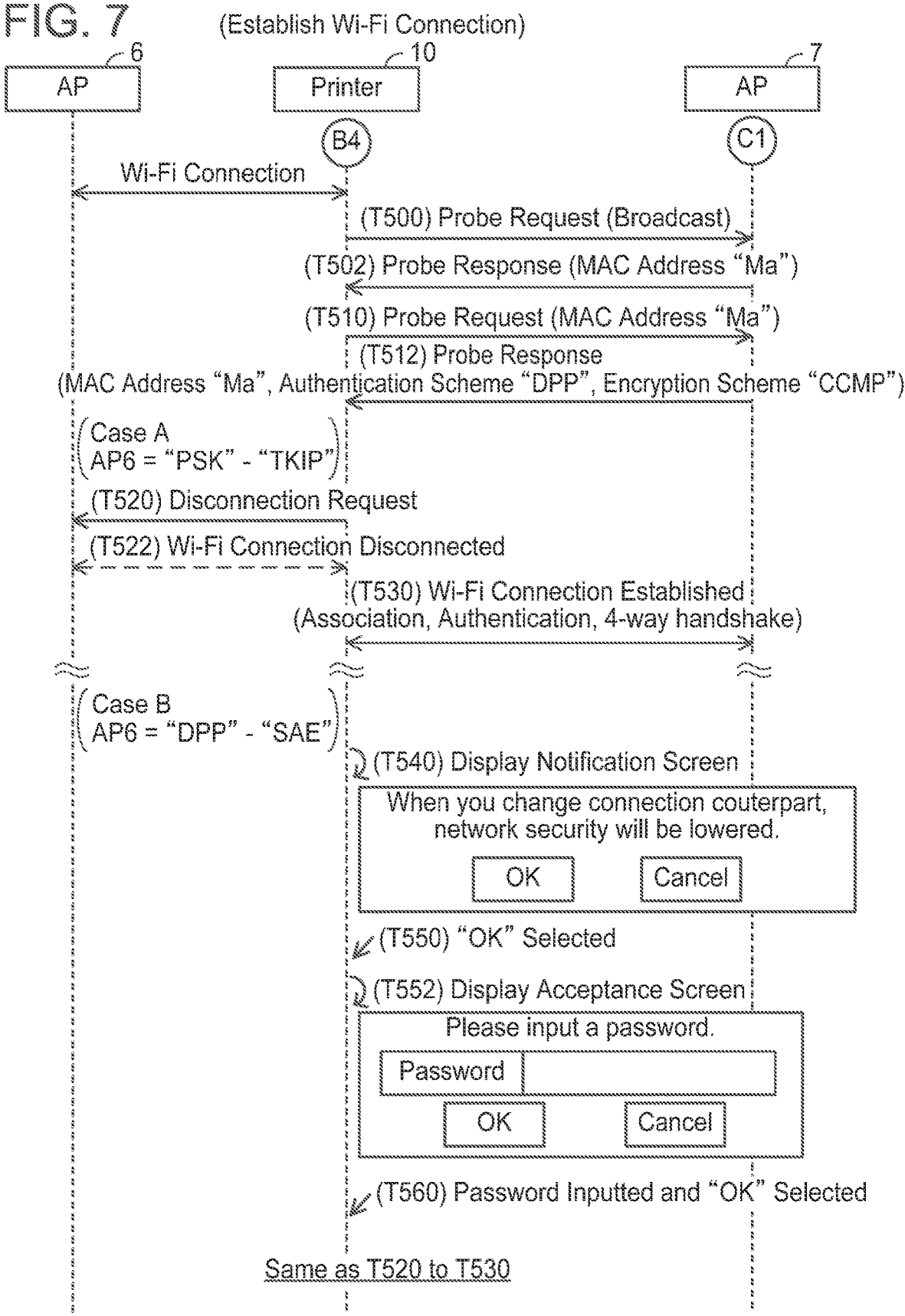
FIG. 7 shows a sequence diagram of a process of Wi-Fi connection establishment.

(Establishment of Wi-Fi Connection; FIG. 7)

Next, details of processes executed in T20 to T30 of FIG. 2 will be described with reference to FIG. 7. In an initial state of FIG. 7, the printer 10 already establishes the Wi-Fi connection with the AP 6.

The printer 10 sends a Probe Request (hereinbelow termed simply as "PReq") by broadcast via the Wi-Fi I/F 16 in T500 and, receives in T502 from the AP 7 a Probe Response (hereinbelow termed simply as "PRes") including the MAC address "Ma" of the AP 7. Then, the printer 10 sends a PReq including the MAC address "Ma" to the AP 7 via the Wi-Fi I/F 16 in T510 and, receives in T512 from the AP 7 a PRes including the MAC address "Ma", the authentication scheme "DPP", and the encryption scheme "CCMP". In this case, the printer 10 uses the authentication ranking information 40 and the encryption ranking information 42 in the memory 34 to determine whether the authentication scheme "DPP" and the encryption scheme "CCMP" in the PRes are respectively ranked the same as or higher than the authentication scheme and the encryption scheme in the connection information 38 stored in the memory 34.

Firstly, a case A in which the connection information 38 includes the authentication scheme "PSK" and the encryption scheme "TKIP" will be described. Firstly, the printer 10 determines, by using the authentication ranking information 40 in the memory, that the two authentication schemes "DPP" and "PSK" are both personal-type authentication schemes and that the authentication scheme "DPP" is ranked higher than the authentication scheme "PSK". Next, by using the encryption ranking information 42 in the memory, the printer 10 determines that the encryption scheme "CCMP" is ranked higher than the encryption scheme "TKIP". In this case, the printer 10 sends the disconnection request to the AP 6 via the Wi-Fi I/F 16 in T520 and disconnects the Wi-Fi connection with the AP 6 in T522. Thereafter, the printer 10 establishes the Wi-Fi connection with the AP 7 in T530. When the process of T530 is completed, the process of case A is terminated.

Next, a case B in which the connection information 38 includes the authentication scheme "DPP" and the encryption scheme "SAE" will be described. Firstly, the printer 10 determines, by using the authentication ranking information 40 in the memory, that the authentication schemes "DPP" are the personal-type authentication schemes and that the authentication schemes "DPP" are ranked the same. Next, by using the encryption ranking information 42 in the memory, the printer 10 determines that the encryption scheme "CCMP" is ranked lower than the encryption scheme "SAE". In this case, in T540, the printer 10 displays, on the display unit 14, a notification screen notifying the user that the security level of a Wi-Fi connection with the AP 7 is lower than the security level of the Wi-Fi connection with the AP 6. By viewing the notification screen displayed on the printer 10, the user can be informed that the security level of a Wi-Fi connection with the AP 7 is lower than the security level of the Wi-Fi connection with the AP 6. The notification screen includes an OK button indicating that a Wi-Fi connection is to be established between the printer 10 and the AP 7, and a Cancel button indicating that a Wi-Fi connection is not to be established between the printer 10 and the AP 7.

In a case where the OK button in the notification screen is selected by the user in T550, the printer 10 causes, in T552, the display unit 14 to display an acceptance screen for accepting an input of a password for establishing a Wi-Fi connection between the printer 10 and the AP 7, from the user. The acceptance screen includes an input field to which a password is inputted, an OK button indicating that a Wi-Fi connection is to be established between the printer 10 and the AP 7, and a Cancel button indicating that a Wi-Fi connection is not to be established between the printer 10 and the AP 7.

In T560, the printer 10 accepts the input of a password P and accepts selection of the OK button in the acceptance screen. In this case, the printer 10 executes the same processes as T520 to T530, and establishes a Wi-Fi connection with the AP 7. Thereby, even in a case where the security level of the Wi-Fi connection with the AP 7 is lower than the security level of the Wi-Fi connection with the AP 6, the Wi-Fi connection can be established between the printer 10 and the AP 7 in response to the operation by the user. When the process of T530 is completed, the process of case B is terminated.

Figure 8:
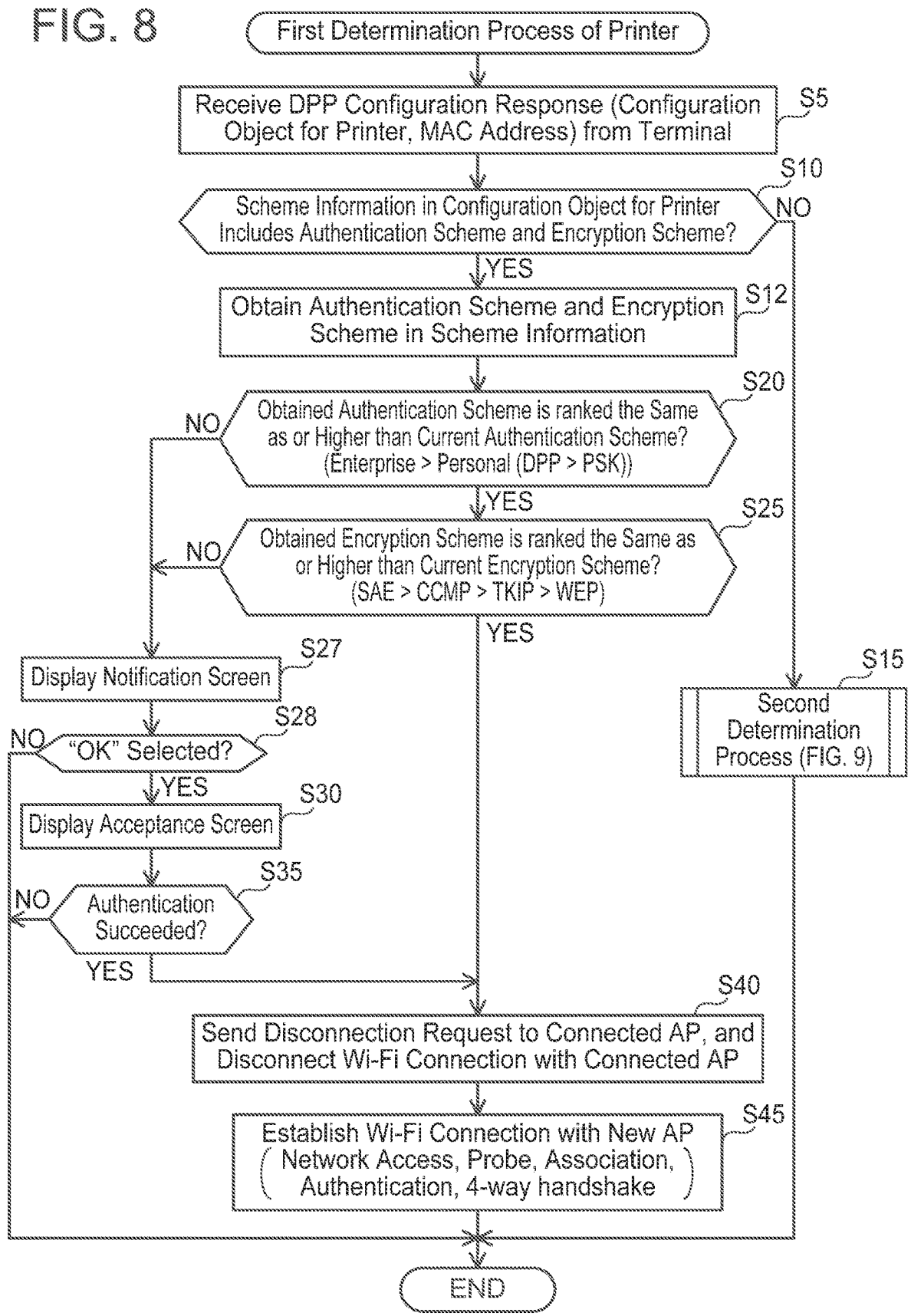
FIG. 8 shows a flowchart of a first determination process of a printer.

(First Determination Process; FIG. 8)

Next, a first determination process executed by the CPU 32 of the printer 10 in order to realize the processes of FIG. 2 to FIG. 7 will be described with reference to FIG. 8. In S5, the printer 10 receives a CReq from the terminal 100 via the Wi-Fi I/F 16 (T310 of FIG. 5). The CReq includes the CO for printer and the MAC address "Ma" of the AP 7.

In S10, the printer 10 determines whether the scheme information included in the CO for printer in the CReq includes an authentication scheme and an encryption scheme. As above, the scheme information includes any one of values among the authentication scheme "PSK", the authentication scheme "DPP", the encryption scheme "SAE", and the combination of the authentication scheme "PSK" and the encryption scheme "SAE". In case of determining that the scheme information includes an authentication scheme and an encryption scheme (YES in S10), that is, in a case where the combination of the authentication scheme "PSK" and the encryption scheme "SAE" is included in the scheme information, the printer 10 obtains the authentication scheme and the encryption scheme in the scheme information in S12. The situation where the combination of the authentication scheme "PSK" and the encryption scheme "SAE" is included in the scheme information is a situation where a Wi-Fi connection is established between the terminal 100 and the AP 7 by communication of a scheme different from the above-described communication according to the DPP scheme, for example, by the user inputting an SSID and a password of the AP 7 to the terminal 100 and various communications (Probe, Association, Authentication, 4-way handshake, etc.) being executed between the terminal 100 and the AP 7. On the other hand, in case of determining that the scheme information includes only one of an authentication scheme and an encryption scheme (NO in S10), that is, in a case where the scheme information includes any of the authentication scheme "PSK", the authentication scheme "DPP", and the encryption scheme "SAE", the printer 10 executes a second determination process in S15.

In S20, the printer 10 uses the authentication ranking information 40 in the memory 34 to determine whether the obtained authentication scheme is ranked the same as or higher than the authentication scheme included in the connection information 38 (hereinafter termed "current authentication scheme") in the memory 34. In case of determining that the obtained authentication scheme is ranked the same as or higher than the current authentication scheme (YES in S20), the printer 10 proceeds to S25. On the other hand, in case of determining that the obtained authentication scheme is ranked lower than the current authentication scheme (NO in S20), the printer 10 proceeds to S27.

In S25, the printer 10 uses the encryption ranking information 42 in the memory 34 to determine whether the obtained encryption scheme is ranked the same as or higher than the encryption scheme included in the connection information 38 (hereinafter termed "current encryption scheme") in the memory 34. In case of determining that the obtained encryption scheme is ranked the same as or higher than the current encryption scheme (YES in S25), the printer 10 proceeds to S40. On the other hand, in case of determining that the obtained encryption scheme is ranked lower than the current encryption scheme (NO in S25), the printer 10 proceeds to S27.

In S27, the printer 10 causes the display unit 14 to display the notification screen. The notification screen includes the OK button and the Cancel button.

In S28, the printer 10 determines whether the OK button in the notification screen is selected by the user. The printer 10 proceeds to S30 in a case where the OK button in the notification screen is selected by the user, while the printer 10 terminates the process of FIG. 8 in a case where the Cancel button in the notification screen is selected by the user.

In S30, the printer 10 causes the display unit 14 to display the acceptance screen. The acceptance screen includes the password input field, the OK button, and the Cancel button. In S35, the printer 10 determines whether authentication of the password succeeds. In case of accepting input of the correct password and selection of the OK button in the acceptance screen from the user, the printer 10 determines YES in S35 and proceeds to S40. On the other hand, in case of accepting input of an incorrect password and selection of the OK button in the acceptance screen from the user, or in case of accepting selection of the Cancel button in the acceptance screen from the user, the printer 10 determines NO in S35 and terminates the process of FIG. 8.

In S40, the printer 10 sends the disconnection request to the AP 6 via the Wi-Fi I/F 16 and disconnects the Wi-Fi connection with the AP 6.

In S45, the printer 10 executes various communications with the AP 7 (NA, Probe, Association, Authentication, 4-way handshake, etc.) and establishes a Wi-Fi connection with the AP 7. When the process of S45 is completed, the process of FIG. 8 is terminated.

Figure 9:
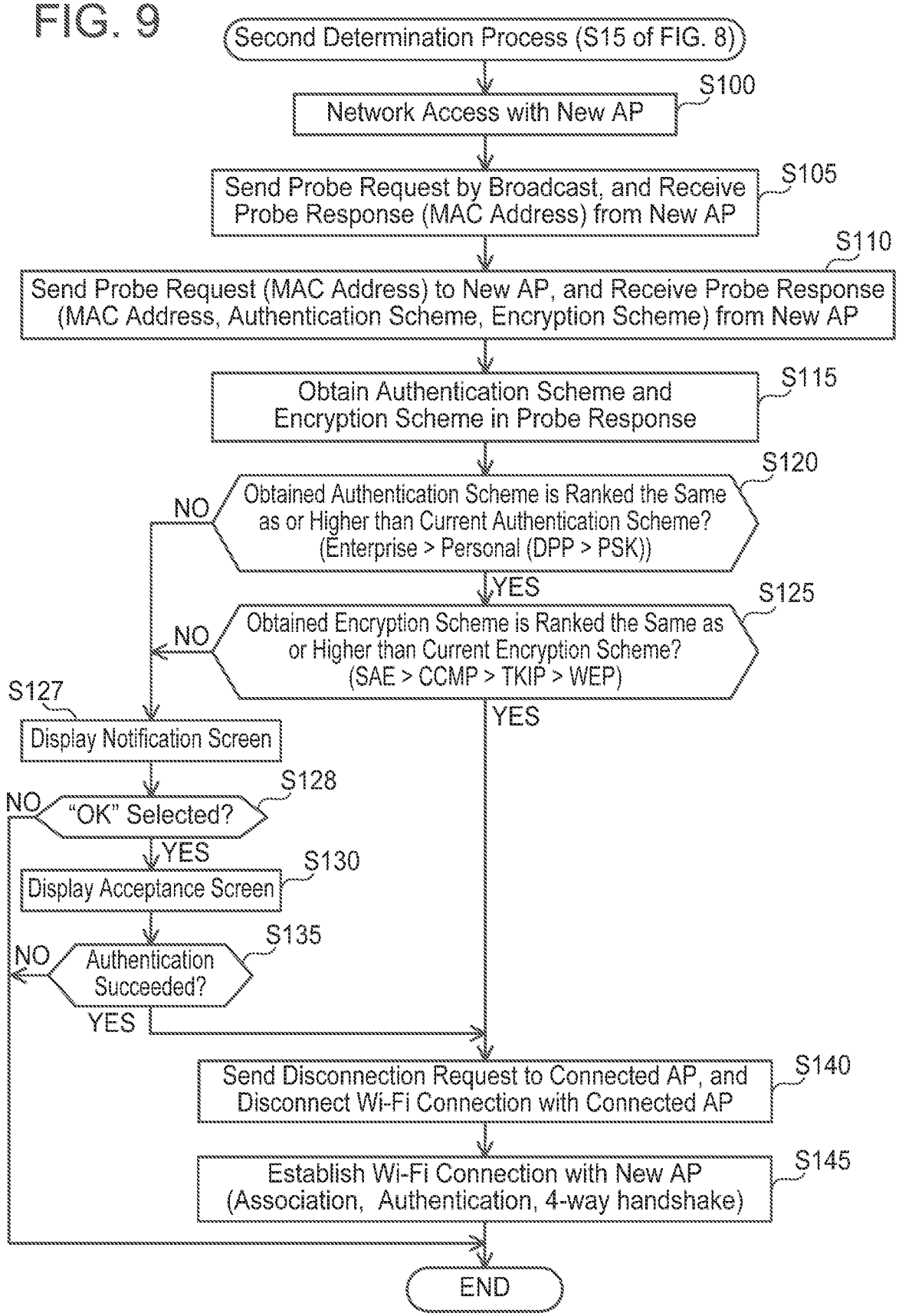
FIG. 9 shows a flowchart of a second determination process of the printer.

(Second Determination Process; FIG. 9)

Next, the second determination process executed in S15 of FIG. 8 will be described with reference to FIG. 9. In S100, the printer 10 executes the NA with the AP 7 (FIG. 6).

In S105, the printer 10 sends a PReq by broadcast via the Wi-Fi I/F 16 (T500 of FIG. 7) and receives a PRes from the AP 7 (T502). This PRes includes the MAC address "Ma" of the AP 7.

In S110, the printer 10 sends, to the AP 7 via the Wi-Fi I/F 16, a PReq including the MAC address "Ma" of the AP 7 (T510 of FIG. 7) and receives a PRes from the AP 7 (T512). This PRes includes the MAC address "Ma" of the AP 7, and an authentication scheme and an encryption scheme used by the AP 7.

In S115, the printer 10 obtains the authentication scheme and the encryption scheme included in the received PRes.

S120 is the same as S20 of FIG. 8. The printer 10 proceeds to S125 in case of determining that the obtained authentication scheme is ranked the same as or higher than the current authentication scheme (YES in S120), while the printer 10 proceeds to S127 in case of determining that the obtained authentication scheme is ranked lower than the current authentication scheme (NO in S120).

S125 is the same as S25 of FIG. 8. The printer 10 proceeds to S140 in case of determining that the obtained encryption scheme is ranked the same as or higher than the current encryption scheme (YES in S125), while the printer 10 proceeds to S127 in case of determining that the obtained encryption scheme is ranked lower than the current encryption scheme (NO in S125).

S127 and S128 are the same as S27 and S28 of FIG. 8. The printer 10 proceeds to S130 in a case where the OK button in the notification screen is selected by the user (YES in S128), while the printer 10 terminates the process of FIG. 9 in a case where the Cancel button in the notification screen is selected by the user (NO in S128).

S130 and S135 are the same as S30 and S35 of FIG. 8. The printer 10 determines YES in S135 and proceeds to S140 in case of accepting input of the correct password and selection of the OK button in the acceptance screen from the user (T560 of FIG. 7). On the other hand, the printer 10 determines NO in S135 and terminates the process of FIG. 9 in case of accepting input of an incorrect password and selection of the OK button in the acceptance screen from the user, or in a case of accepting selection of the Cancel button in the acceptance screen from the user.

S140 is the same as S40 of FIG. 8. In S145, the printer 10 executes various communications (Association, Authentication, 4-way handshake, etc.) with the AP 7 and establishes a Wi-Fi connection with the AP 7. When the process of S145 is completed, the process of FIG. 9 is terminated.

Effect of Present Embodiment

According to the present embodiment, in a case where the QR code button in the setting screen is selected by the user (T122 of FIG. 3) under a state where the printer 10 establishes the Wi-Fi connection with the AP 6, the printer 10 obtains the authentication scheme and the encryption scheme used by the AP 7 (S12 of FIG. 8 or S115 of FIG. 9), determines whether the authentication scheme of the Wi-Fi connection with the AP 7 is ranked the same as or higher than the authentication scheme of the Wi-Fi connection with the AP 6 (S20 or S120), and determines whether the encryption scheme of the Wi-Fi connection with the AP 7 is ranked the same as or higher than the encryption scheme of the Wi-Fi connection with the AP 6 (S25 or S125). In case of determining that the authentication scheme of the Wi-Fi connection with the AP 7 is ranked the same as or higher than the authentication scheme of the Wi-Fi connection with the AP 6 and determining that the encryption scheme of the Wi-Fi connection with the AP 7 is ranked the same as or higher than the encryption scheme of the Wi-Fi connection with the AP 6, that is, in case of determining that the security level of the Wi-Fi connection with the AP 7 is not lower than the security level of the Wi-Fi connection with the AP 6, the printer 10 establishes the Wi-Fi connection with the AP 7 (S45 or S145). On the other hand, in case of determining that the authentication scheme of the Wi-Fi connection with the AP 7 is ranked lower than the authentication scheme of the Wi-Fi connection with the AP 6, or in case of determining that the encryption scheme of the Wi-Fi connection with the AP 7 is ranked lower than the encryption scheme of the Wi-Fi connection with the AP 6, that is, in case of determining that the security level of the Wi-Fi connection with the AP 7 is lower than the security level of the Wi-Fi connection with the AP 6, the printer 10 causes the display unit 14 to display the notification screen (S27 or S127) and causes the display unit 14 to display the acceptance screen (S30 or S130). Therefore, in the state where the Wi-Fi connection is established between the printer 10 and the AP 6, establishment of a Wi-Fi connection having a security level lower than the security level of the Wi-Fi connection with the AP 6 can be prevented between the printer 10 and the AP 7.

(Correspondence Relationships)

The printer 10, the terminal 100, the AP 6, and the AP 7 are examples of "communication device", "external device", "first parent station", and "second parent station", respectively. The security level of the AP 6 and the security level of the AP 7 are examples of "first security level" and "second security level", respectively. The process of displaying the notification screen and the process of displaying the acceptance screen are examples of "notification process" and "acceptance process", respectively. The Wi-Fi connection between the printer 10 and the AP 6, and the Wi-Fi connection between the printer 10 and the AP 7 are examples of "first wireless connection", and "second wireless connection", respectively.

The Wi-Fi I/F 16 and the display unit 14 of the printer 10 are examples of "wireless interface" and "output unit", respectively. The CReq and the CRes are examples of "first information request" and "first information response", respectively. The PReq of T510 and the PRes of T512 in FIG. 7 are examples of "second information request" and "second information response", respectively. The public key PPK1 and the QR code of the printer 10 are examples of "public key" and "specific information", respectively. The AReq and the ARes are examples of "authentication request" and "authentication response", respectively. The CO for printer is an example of "connection information".

The process of S12 (or S115 of FIG. 9), the processes of S20 and S25 (or S120 and S125), the processes of S27 and S30 (or S127 and S130), and the process of S45 in FIG. 8 (or S145) are examples of processes of "obtain second security information", "determine whether the second security level indicated by the second security information is lower than the first security level", "execute at least one process of a notification process or an acceptance process", "establish the second wireless connection with the second parent station without executing the at least one process", respectively.

Figure 10:
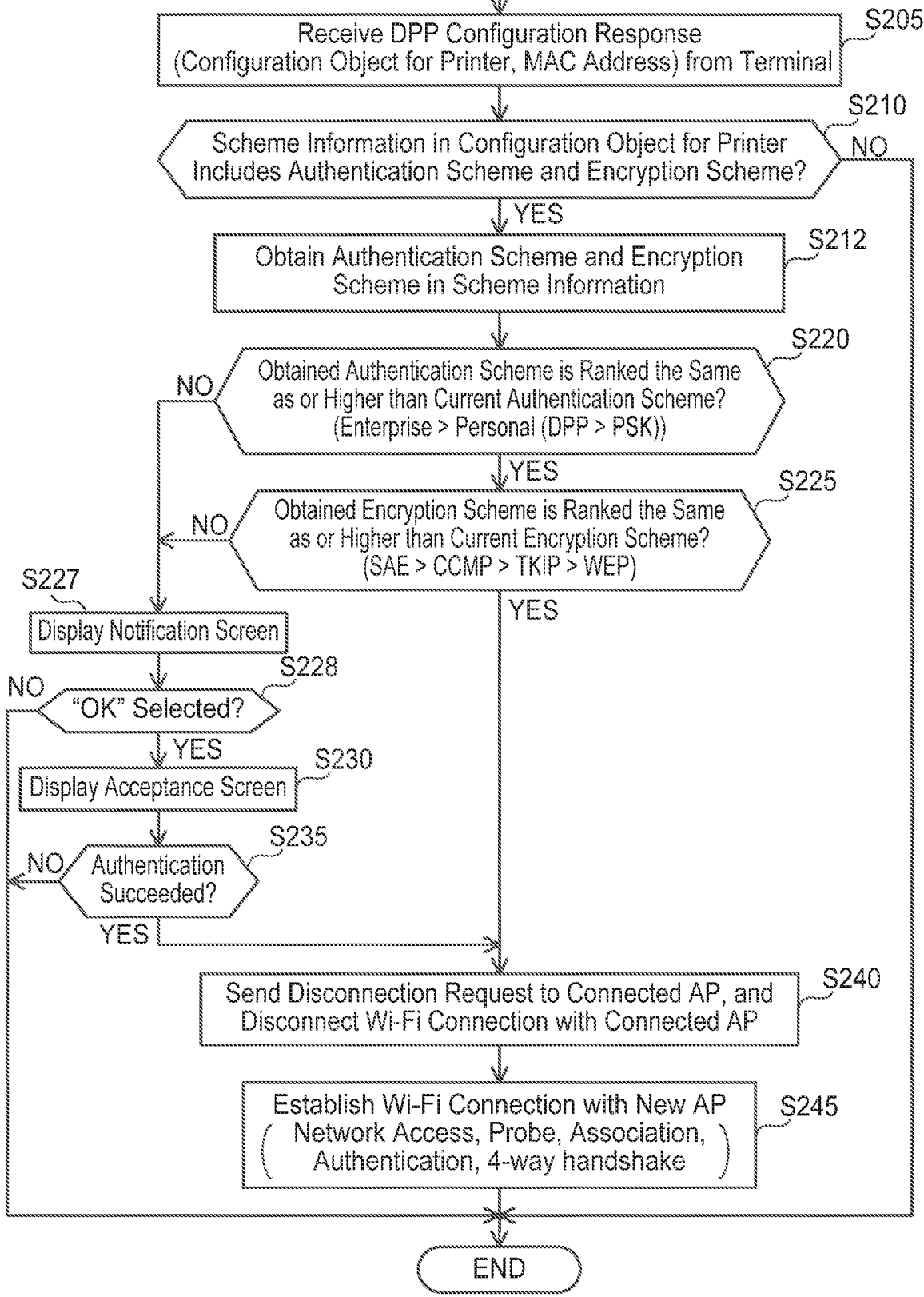
FIG. 10 shows a flowchart of a first determination process of a printer of a second embodiment.

Second Embodiment; FIG. 10

Next, a second embodiment will be described with reference to FIG. 10. The second embodiment differs from the first embodiment in that a first determination process shown in FIG. 10 is executed instead of the first determination process shown in FIG. 8.

S205 and S210 are the same as S5 and S10 of FIG. 8. However, in this embodiment, in a case of determining NO in S210, the printer 10 terminates the process of FIG. 10 without executing the second determination process. Thereby, the processing load of the printer 10 can be reduced. S212 to S245 are the same as S12 to S45 of FIG. 8. When the process of S245 is completed, the process of FIG. 10 is terminated.

(Variant 1) The processes of S30 and S35 of FIG. 8 may be omitted. In this case, in the case where the OK button is selected in the notification screen by the user (YES in S28), the printer 10 skips the processes of S30 and S35, and proceeds to S40. Alternatively, in another variant, the processes of S27 and S28 may be omitted. In this case, in the case of determining NO in S20 or S25, the printer 10 skips the processes of S27 and S28, and proceeds to S30. That is, at least one of "notification process" or "acceptance process" may be executed.

(Variant 2) In S27 of FIG. 8, the printer 10 may cause the display unit 14 to display a notification screen that does not include the OK button or the Cancel button. In this case, the printer 10 terminates the process of FIG. 8 in response to a predetermined time having elapsed since the notification screen was displayed. In this variant, "after the at least one process has been executed, establish the second wireless connection with the second parent station" may be omitted.

(Variant 3) In S27 of FIG. 8, instead of causing the display unit 14 to display the notification screen, the printer 10 may, for example, send notification screen data representing the notification screen to the terminal 100. In a case of receiving the notification screen data from the printer 10, the terminal 100 displays the notification screen represented by the notification screen data. In this variant, the process of sending the notification screen data to the terminal 100 is an example of "notification process". Alternatively, in another variant, the printer may cause the print executing unit 18 to execute print in accordance with print data representing a notification image that includes a message indicating that the security level of the Wi-Fi connection with the AP 7 is lower than the security level of the Wi-Fi connection with the AP 6. In this variant, the process of causing the print executing unit 18 to execute print in accordance with the print data representing the notification image is an example of "notification process".

(Variant 4) In S30 of FIG. 8, instead of causing the display unit 14 to display the acceptance screen, the printer 10 may send acceptance screen data representing the acceptance screen to the terminal 100. In response to receiving the acceptance screen data from the printer the terminal 100 displays the acceptance screen represented by the acceptance screen data. In a case of accepting input of a password from the user in the acceptance screen, the terminal 100 sends this password to the printer 10. The printer 10 determines YES in S35 and proceeds to S40 in a case where the received password is the correct password, while the printer 10 determines NO in S35 and terminates the process of FIG. 8 in a case where the received password is an incorrect password. In this variant, the process of receiving the password from the terminal 100 is an example of "acceptance process".

(Variant 5) The printer 10 may omit the process of FIG. 8 and the process of S100 in FIG. 9, and may execute only the processes of S105 to S145. In this variant, "send a first information request", "receive a first information response", "determine whether the first information response includes the second security information", "output unit", "receive an authentication request", "send an authentication response" may be omitted.

(Variant 6) In S20 of FIG. 8, the printer 10 may skip the process of S25 and execute the process of S40 in case of determining that the obtained authentication scheme is ranked the same as or higher than the current authentication scheme (YES in S20), while the printer 10 may execute the process of S25 in case of determining that the obtained authentication scheme is ranked lower than the current authentication scheme (NO in S20).

(Variant 7) The processes of S40 in FIGS. 8 and S140 in FIG. 9 may be omitted. In this variant, "disconnect the first wireless connection" may be omitted.

(Variant 8) The Wi-Fi connection between the printer 10 and the AP 6 simply needs to be disconnected before the Wi-Fi connection is established between the printer 10 and the AP 7. For example, in the case where the QR code button in the setting screen is selected by the user in T120 of FIG. 3, the printer 10 may send the disconnection request to the AP 6 via the Wi-Fi I/F 16 to disconnect the Wi-Fi connection with the AP 6. Further, in this case, the printer 10 may re-establish the Wi-Fi connection with the AP 6 in case of determining NO in S20 of FIG. 8 (or S120 of FIG. 9), or in S25 (or S125).

(Variant 9) The process of S45 in FIG. 8 (or S145 in FIG. 9) may be executed before the process of S40 (or S140) is executed. That is, "establish the second wireless connection with the second parent station without executing the at least one process" may be executed before the first wireless connection is disconnected.

(Variant 10) For example, the QR code displayed on the printer 10 in T122 of FIG. 3 may not be one in which the channel list and the MAC address are coded. That is, the QR code may simply be a code image obtained by coding at least the public key PPK1. In this case, in response to displaying the QR code on the display unit 14 in T122, the printer 10 monitors receipt of an AReq using one wireless channel among all wireless channels which the printer 10 is capable of using. Further, in T210 of FIG. 4, the terminal 100 sequentially broadcasts the AReq by sequentially using all wireless channels which the terminal 100 is capable of using. That is, "specific information" may simply be information that can be obtained by using at least the public key.

(Variant 11) The processes for creating the shared key (for example, SK1) (such as T201, T212 of FIG. 4) are not limited to the processes according to the ECDH described in the above embodiments, but may be other processes according to the ECDH. Further, the processes for creating the shared key are not limited to the processes according to the ECDH, and processes according to other schemes (such as Diffie-Hellman key exchange (DH)) may be executed instead. Further, in the above embodiments, the digital signatures DS1 and DS2 are created according to the ECDSA, however, they may be created according to other schemes (such as Digital Signature Algorithm (DSA), Rivest-Shamir-Adleman cryptosystem (RAS), etc.).

(Variant 12) The printer 10 may cause the print executing unit 18 to print the QR code on a print medium, instead of causing the display unit 14 to display the QR code in T122 of FIG. 3. In this variant, the Wi-Fi connection can be established between the printer 10 and the AP 7 by executing the communication according to the DPP scheme, for example, even in a situation where the printer 10 is not provided with the display unit 14 and cannot display screens such as the menu screen in T105 of FIG. 3, the setting screen in T107, and the screen for QR code in T122. In this variant, the print executing unit 18 is an example of "output unit". In another variant, the printer 10 may be provided with a wireless interface that is different from the Wi-Fi OF 16 (such as a Near Field Communication (NFC) I/F, a Bluetooth (registered trademark) I/F). The Bluetooth I/F includes a wireless interface configured to execute communication complying with the Bluetooth scheme version 4.0 or higher. In this case, in T122 of FIG. 3, the printer 10 may send the public key PPK1, the channel list, and the MAC address to the terminal 100 via this wireless interface. In this variant, the wireless interface that is different from the Wi-Fi I/F 16 is an example of "output unit".

(Variant 13) The standard "Device Provisioning Protocol Technical Specification Version 1.0" created by the Wi-Fi Alliance describes that a shared code, a key, a phrase, and a word are called "code". Therefore, in T122, the printer 10 may display, on the display unit 14, an image including a shared code, a key, a phrase, and a word obtained by coding the public key PPK1, the channel list, and the MAC address, instead of the QR code.

(Variant 14) "Communication device" may not be the printer, and may be another device such as a scanner, a multi-function peripheral, mobile terminal, a PC, and a server.

(Variant 15) In the embodiments above, the processes of FIGS. 2 to 10 are implemented by software (that is, the program 36), however, at least one of these processes may be implemented by hardware such as a logic circuit.

What is claimed is:

1. A communication device comprising:
   a processor; and
   a memory storing first security information indicating a first security level related to a first wireless connection with a first parent station, the memory further storing computer-readable instructions therein, the computer-readable instructions, when executed by the processor, causing the communication device to:
   in a case where a first instruction for establishing a second wireless connection with a second parent station different from the first parent station is accepted, obtain second security information indicating a second security level related to the second wireless connection;
   in a case where the second security level is lower than the first security level, execute at least one process of a notification process or an acceptance process, the notification process being for notifying that the second security level is lower than the first security level, the acceptance process being for accepting an input of authentication information for establishing the second wireless connection with the second parent station; and
   in a case where the second security level is not lower than the first security level, establish the second wireless connection with the second parent station without executing the at least one process.

2. The communication device as in claim 1, wherein the computer-readable instructions, when executed by the processor, further cause the communication device to:
   in a case where a second instruction for establishing the second wireless connection with the second parent station is accepted after the at least one process has been executed, establish the second wireless connection with the second parent station.

3. The communication device as in claim 1, further comprising a display unit,
   wherein the notification process includes a process of displaying a notification screen on the display unit, the notification screen notifying that the second security level is lower than the first security level, and
   the acceptance process includes a process of displaying an acceptance screen on the display unit, the acceptance screen accepting the input of the authentication information for establishing the second wireless connection with the second parent station.

4. The communication device as in claim 1, further comprising a wireless interface,
   wherein the computer-readable instructions, when executed by the processor, further cause the communication device to:
   send, to an external device via the wireless interface, a first information request that requests sending of the second security information in the case where the first instruction is accepted, the external device being different from the first parent station and the second parent station; and
   receive a first information response from the external device via the wireless interface in response to the first information request being sent to the external device, and
   wherein in a case where the first information response is received from the external device and the first information response includes the second security information, the second security information included in the first information response is obtained.

5. The communication device as in claim 4, wherein the computer-readable instructions, when executed by the processor, further cause the communication device to:
   in a case where the first information response does not include the second security information, send, to the second parent station via the wireless interface, a second information request that requests sending of the second security information; and
   receive a second information response including the second security information from the second parent station via the wireless interface in response to the second information request being sent to the second parent station,
   wherein in a case where the first information response includes the second security information, the second security information included in the first information response is obtained, and
   in a case where the second information response is received from the second parent station, the second security information included in the second information response is obtained.

6. The communication device as in claim 4, further comprising an output unit,
   wherein the computer-readable instructions, when executed by the processor, further cause the communication device to:
   cause the output unit to output specific information obtained by using a public key of the communication device, the public key being obtained by the external device in response to the specific information being outputted;
receive an authentication request in which the public key is used from the external device via the wireless interface after the specific information has been outputted; and
send an authentication response to the external device via the wireless interface in response to the authentication request being received from the external device,
wherein the first information request is sent to the external device via the wireless interface after the authentication response has been sent to the external device,
in response to the first information request being sent to the external device, the first information response that includes connection information for establishing the second wireless connection between the communication device and the second parent station is received from the external device via the wireless interface,
in a case where the first information response is received from the external device and the connection information in the first information response includes the second security information, the second security information included in the connection information is obtained, and
in the case where the second security level is not lower than the first security level, the second wireless connection with the second parent station is established via the wireless interface by using the connection information.

7. The communication device as in claim 4, wherein the wireless interface is an interface configured to execute a wireless communication according to a Wi-Fi scheme.

8. The communication device as in claim 1, further comprising a wireless interface,
wherein the computer-readable instructions, when executed by the processor, further cause the communication device to:
in the case where the first instruction is accepted, send, to the second parent station via the wireless interface, a second information request that requests sending of the second security information; and
receive a second information response including the second security information from the second parent station via the wireless interface in response to the second information request being sent to the second parent station, and
wherein in a case where the second information response is received from the second parent station, the second security information included in the second information response is obtained.

9. A communication device comprising:
a processor; and
a memory storing first security information indicating a first security level related to a first wireless connection with a first parent station, the memory further storing computer-readable instructions therein, the computer-readable instructions, when executed by the processor, causing the communication device to:
in a case where a first instruction for establishing a second wireless connection with a second parent station different from the first parent station is accepted, obtain second security information indicating a second security level related to the second wireless connection; and
in a case where the second security level is not lower than the first security level, establish the second wireless connection with the second parent station, wherein in a case where the second security level is lower than the first security level, the second wireless connection is not established.

10. The communication device as in claim 9, further comprising a wireless interface,
wherein the computer-readable instructions, when executed by the processor, further cause the communication device to:
send, to an external device via the wireless interface, a first information request that requests sending of the second security information in the case where the first instruction is accepted, the external device being different from the first parent station and the second parent station; and
receive a first information response from the external device via the wireless interface in response to the first information request being sent to the external device, and
in a case where the first information response is received from the external device and the first information response includes the second security information, the second security information included in the first information response is obtained.

11. The communication device as in claim 10, wherein the computer-readable instructions, when executed by the processor, further cause the communication device to:
in a case where the first information response does not include the second security information, send, to the second parent station via the wireless interface, a second information request that requests sending of the second security information; and
receive a second information response including the second security information from the second parent station via the wireless interface in response to the second information request being sent to the second parent station,
wherein in a case where the first information response includes the second security information, the second security information included in the first information response is obtained, and
in a case where the second information response is received from the second parent station, the second security information included in the second information response is obtained.

12. The communication device as in claim 10, further comprising an output unit,
wherein the computer-readable instructions, when executed by the processor, further cause the communication device to:
cause the output unit to output specific information obtained by using a public key of the communication device, the public key being obtained by the external device in response to the specific information being outputted;
receive an authentication request in which the public key is used from the external device via the wireless interface after the specific information has been outputted; and
send an authentication response to the external device via the wireless interface in response to the authentication request being received from the external device, wherein the first information request is sent to the external device via the wireless interface after the authentication response has been sent to the external device, in response to the first information request being sent to the external device, the first information response that includes connection information for establishing the second wireless connection between the communication device and the second parent station is received from the external device via the wireless interface, in a case where the first information response is received from the external device and the connection information in the first information response includes the second security information, the second security information included in the connection information is obtained, and in the case where the second security level is not lower than the first security level, the second wireless connection with the second parent station is established via the wireless interface by using the connection information.

13. The communication device as in claim 10 wherein the wireless interface is an interface conforming to a Wi-Fi scheme.

14. The communication device as in claim 9, further comprising a wireless interface, wherein the computer-readable instructions, when executed by the processor, further cause the communication device to:

in the case where the first instruction is accepted, send, to the second parent station via the wireless interface, a second information request that requests sending of the second security information; and receive a second information response including the second security information from the second parent station via the wireless interface in response to the second information request being sent to the second parent station, wherein in a case where the second information response is received from the second parent station, the second security information included in the second information response is obtained.

15. A non-transitory computer-readable recording medium storing computer-readable instructions for a communication device, wherein the communication device comprises a memory storing first security information indicating a first security level related to a first wireless connection with a first parent station, and the computer-readable instructions, when executed by a processor of the communication device, cause the communication device to:

in a case where a first instruction for establishing a second wireless connection with a second parent station different from the first parent station is accepted, obtain second security information indicating a second security level related to the second wireless connection;

in a case where the second security level is lower than the first security level, execute at least one process of a notification process or an acceptance process, the notification process being for notifying that the second security level is lower than the first security level, the acceptance process being for accepting an input of authentication information for establishing the second wireless connection with the second parent station; and in a case where the second security level is not lower than the first security level, establish the second wireless connection with the second parent station without executing the at least one process.

* * * * *